United States Patent [19]

Song

[11] Patent Number: 5,208,756

[45] Date of Patent: May 4, 1993

[54] VEHICLE LOCATING AND NAVIGATING SYSTEM

[76] Inventor: Han L. Song, 6906 Hana Rd., Edison, N.J. 08817

[21] Appl. No.: 646,706

[22] Filed: Jan. 28, 1991

[51] Int. Cl.$^5$ ............................................. G01S 3/02
[52] U.S. Cl. ................................... 364/449; 342/457; 455/54.1; 340/991
[58] Field of Search ....................... 364/449, 443, 444; 342/457, 450, 465; 340/900, 991-993; 455/33, 53, 54, 56

[56] References Cited

U.S. PATENT DOCUMENTS

| | | | |
|---|---|---|---|
| 3,357,020 | 12/1967 | Slifer, Jr. | 342/44 |
| 3,419,865 | 12/1968 | Chisholm | 342/457 |
| 3,518,674 | 6/1970 | Moorehead et al. | 342/457 |
| 3,568,161 | 3/1971 | Knickel | 340/992 |
| 3,646,580 | 2/1972 | Fuller et al. | 340/989 |
| 3,680,121 | 7/1972 | Anderson et al. | 342/457 |
| 3,697,941 | 10/1972 | Christ | 340/992 |
| 3,714,650 | 1/1973 | Fuller et al. | 342/42 |
| 3,848,254 | 11/1974 | Drebinger et al. | 342/457 |
| 3,886,554 | 5/1975 | Braun et al. | 342/457 |
| 4,209,787 | 6/1980 | Freeny, Jr. | 364/449 |
| 4,222,115 | 9/1980 | Cooper et al. | 455/33 |
| 4,475,010 | 10/1984 | Huensch et al. | 455/56 |
| 4,651,157 | 3/1987 | Gray et al. | 342/457 |
| 4,680,590 | 7/1987 | Lowe et al. | 342/457 |
| 4,728,959 | 3/1988 | Maloney et al. | 342/457 |
| 4,742,357 | 5/1988 | Rackley | 342/457 |
| 4,818,998 | 4/1989 | Apsell et al. | 342/457 |
| 4,891,650 | 1/1990 | Sheffer | 342/457 |
| 4,908,629 | 3/1990 | Apsell et al. | 342/457 |
| 5,003,317 | 3/1991 | Gray et al. | 342/465 |
| 5,055,851 | 10/1991 | Sheffer | 342/457 |

FOREIGN PATENT DOCUMENTS 2460813 3/1981 France .
63-145976 6/1988 Japan .

OTHER PUBLICATIONS

Trackmobile, Inc., updated Business Plan (as of Oct. 1, 1990) D. Sweeney, Stolen Vehicle Recovery, Cellular Business (Sep. 1990).

Sang-Bin Rhee, Vehicle Location In Angular Sectors Based On Signal Strength, IEEE Transactions On Vehicular Technology, vol. VT-27, No. 4—Nov. 1978, pp. 244-258.

The promotional brochure titled "Hawk 3000 from Trackmobile, Inc." contains a further discussion of the vehicle locating system disclosed in U.S. Pat. No. 4,891,650.

Primary Examiner—Gary Chin
Attorney, Agent, or Firm—Lerner, David, Littenberg, Krumholz & Mentlik

[57] ABSTRACT

A vehicle locating and navigating system operating in conjunction with a cellular telephone network is provided. A small, hidden device located in a vehicle is activated through DTMF signals transmitted from any telephone station. Upon activation, the device determines the power at which normally transmitted control channels are received from several base stations of the network. Based upon these determinations, the device then calculates the distance between the vehicle and each of the base stations and, using triangulation or arculation, determines the location of the vehicle. The locational information is transmitted through a voice synthesizer back to the telephone station from which the activation signal is received, or to a different telephone station dedicated to receive this information. The locational information also is transmitted digitally to a central station where the position of the vehicle is displayed on a computer screen along with a graphical representation of a map of the region served by the cellular telephone network. An operator at the central station can assist the vehicle's operator with navigational information or provide tracking coordinates to a tracking vehicle equipped with a similar device.

40 Claims, 3 Drawing Sheets

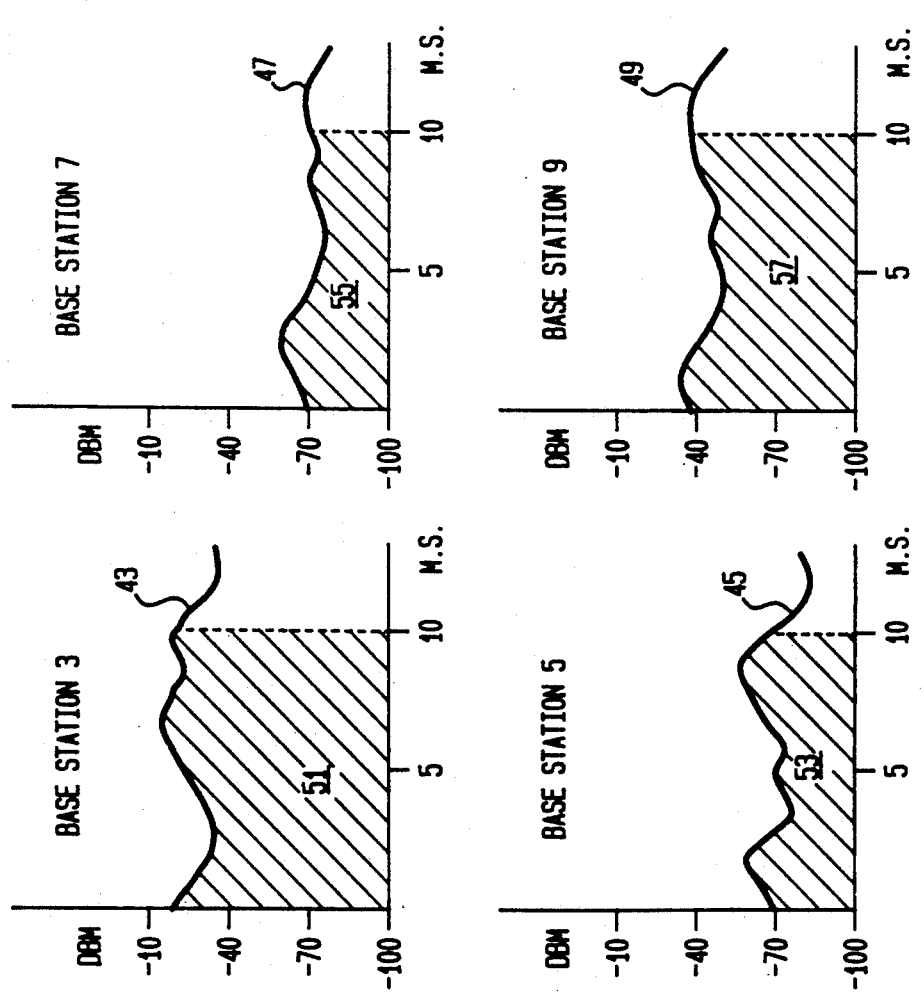
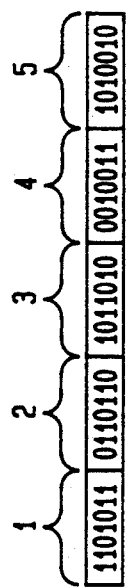
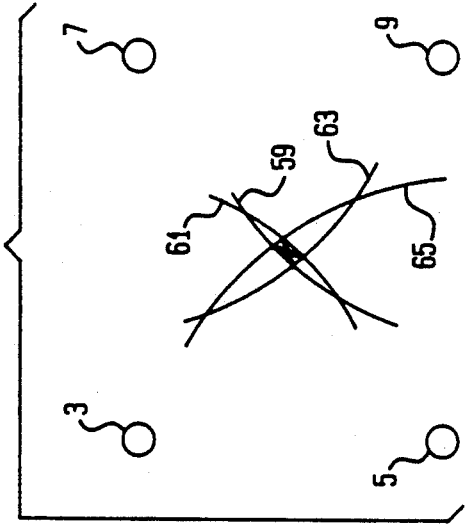
FIG. 4
FIG. 5
FIG. 6

VEHICLE LOCATING AND NAVIGATING SYSTEM

BACKGROUND OF THE INVENTION

This invention pertains to methods and apparatus for locating and tracking vehicles and, more particularly, to methods and apparatus for locating and tracking vehicles using a cellular telephone network.

Vehicle locating and navigating systems fall into three categories. The first category, known as dead-reckoning systems, encompasses systems which employ an electronic monitor mounted on the vehicle which constantly tracks the movement of the vehicle's wheels to determine direction and distance. This information is transmitted to a control station which relates the information to the vehicle's initial position, as indicated in the memory of a computer at the control station.

The second category encompasses systems which employ homing techniques. Examples of such systems are disclosed in U.S. Pat. Nos. 4,818,998 and 4,908,629 to Apsell et al. In these systems, a transmitter is mounted on the vehicle which emits a constant signal upon activation. A tracking vehicle, such as a police cruiser, "homes in" on the signal source using a directional antenna to determine the direction of the signal's greatest strength.

The third category encompasses systems which use triangulation or trilateralization (also known as "arculation") to determine the vehicle's location. These systems employ several land or airborne base stations (such as satellites) whose position is known and which transmit signals to, or receive signals from, the vehicle. A parameter of the signal is used to determine either the distance between each of the base stations and the vehicle, or the direction from each of the base stations to the vehicle. These data then are used for triangulation or trilateralization to determine the vehicle's position.

U.S. Pat. No. 4,891,650 to Sheffer discloses a vehicle locating and tracking system which uses the base stations of a cellular telephone network. The system comprises a mobile transmitter located on the vehicle which transmits an alarm signal upon activation to detectors located at the base stations of the network. These detectors receive the transmitted signal and transmit, to a central station, a corresponding signal indicating the strength of the received signal and the identity of the base stations receiving the signal. A computer at the central station uses these data to determine the distance between the vehicle and each of the base stations and, through trilateralization, to determine the vehicle's position.

U.S. Pat. No. 3,680,121 to Anderson, et al. also discloses a vehicle locating and tracking system using the base stations of a cellular telephone network. A transmitter located on the vehicle transmits a signal which is modulated onto a carrier for transmission to the base stations. Detectors located at the base stations determine the phase of the modulating signal with respect to a synchronization signal transmitted from a local television station. The differences in phase of the received modulating signal from at least three base stations are used to calculate the distances between the vehicle and these base stations. These data then are used to determine the vehicle's position.

An article by D. Sweeney, *Stolen Vehicle Recovery* (Cellular Business, September 1990) discloses a vehicle locating system of Code-Alarm Company which employs a device located on the vehicle for receiving signals from the base stations of the LORAN navigational network. This network transmits pulsed signals over large sections of the globe, primarily for use by ships in navigation. By measuring the differences in the times of arrival of these pulses from several base stations, the position of the vehicle is determined. The device then transmits the position-location information to a central station over a cellular telephone network.

In practice, all of these systems have presented problems. Dead-reckoning systems are expensive, accumulate errors over time and require frequent recalibration.

Homing systems require the active participation of the police or private security personnel for the operation of a tracking vehicle. These systems, moreover, generally are effective only over line-of-sight distances.

Although systems employing methods of triangulation or trilateralization can be more accurate and do not require the intervention of a tracking vehicle, these systems are prohibitively expensive if a dedicated system of base stations is required.

Although the systems disclosed in U.S. Pat. Nos. 4,891,650 and 3,680,121 employ an existing network of cellular telephone base stations, these systems nevertheless require substantial additional equipment. Dedicated circuitry must be installed at each base station to receive and interpret signals from the vehicle's transmitter and to transmit corresponding signals in response to these signals. Also, particularly in the case of stolen vehicle recovery, it is difficult to obtain sufficient power from a small, hidden transmitter for interaction with a sufficient number of cellular base stations to accurately determine location. For example, a typical transmitter of a cellular telephone normally has the capacity for communication with only the nearest base station within the network. These systems, moreover, present problems of accuracy because of multipath interference of the signal transmitted from the vehicle.

The system of Code-Alarm Company, disclosed in the article by D. Sweeney, *Stolen Vehicle Recovery*, also employs an existing network of base stations, the LORAN navigational network. The Code-Alarm system attempts to avoid the problems of transmitting a signal from the vehicle, for the determination of distance, by using signals transmitted from the base stations for this determination. The parameter of the signals used is the differences in the times of arrival of these signals at the local receiver in the vehicle. The LORAN network, however, is not well suited for precise location of a vehicle in, e.g., a large city. This network is designed for long-range navigation and, without a prohibitively large receiving antenna on the vehicle, provides a relatively coarse resolution.

SUMMARY OF THE INVENTION

The present invention provides an inexpensive, accurate system for determining a vehicle's location using the existing base stations and signals of a cellular telephone network.

In a typical cellular telephone network, a geographic area is divided into a number of small neighboring cells, each containing a base station, i.e., a small radio tower with a service radius of 1–30 miles. Each base station is assigned a number of two-way voice channels, channels used to transmit voice signals to and from the mobile unit, and a number of set-up or control channels, channels used for the transmission of digital control information to and from the mobile unit for establishing a voice-communication link. The control channels assigned to each base station generally include several fields of data, including fields identifying the base station transmitting the signal and, in some cases, the power of the signal's transmission. The FCC requires that this power be less than 500 watts (57 dbm), but the actual power of these signals generally is less than 100 watts (50 dbm). The power of transmission of the control channels for each base station generally is higher than the power of transmission of the voice channels.

The power of the signals transmitted on the control and voice channels from each base station decreases in a fixed amount (attenuation factor) in direct relationship to the distance from the base station. This relationship corresponds to the following formula:

$$P_r = kP_t/d^n$$

wherein $P_r$ equals the power of the signal received from the base station, k is a constant, $P_t$ equals the transmitting power of the signal transmitted from the base station, d equals the distance between the base station and the point where the signal is received, and n is the attenuation factor. The attenuation factor generally ranges between 2 and 6, and depends principally upon the geographical terrain (e.g., farmland, mountains, cities, suburban regions, etc.) in which the base station is located.

The present invention takes advantage of these phenomena and principles governing a typical cellular telephone network. A small device, located in the vehicle, receives signals transmitted from several of the base stations in the network. These signals preferably are the signals transmitted on the control or set-up channels from these base stations. The device includes means for determining the power at which each of these signals is received. These means preferably include means for sampling the received-power of each signal over a fixed period of time and for calculating the average received-power of these samples for each signal.

The device also includes means for determining the location of each base station from which each signal is transmitted, the transmitting power at which each signal is transmitted, and the signal-attenuation factor of each signal. These means preferably read the base-station's identification and transmitting power directly from the signal. The signal-attenuation factor for each signal also can be transmitted with, and read directly from, this signal. In the alternative, the signal-attenuation factor for each base station, and the location of the base station identified from the signal, are stored in a read only memory (ROM) included in the device. The transmitting power of the signal from each base station also can be stored in the ROM, rather than read directly from the signal.

Since the attenuation factor for the signal transmitted from each base station varies from base station to base station, this factor generally must be empirically calculated before the device is constructed. Also, this factor is subject to change with time by, e.g., additional development within the area surrounding the base station. Base stations, moreover, may be added or deleted from the network over time, and their transmitting power, and other features of the signal transmitted on the control or set-up channels, may change with time. Preferably, therefore, the ROM is replaceable and can be updated with a new ROM having these new data.

The device in the vehicle further includes means for calculating the distance between the vehicle and each of the base stations as a function of the transmitting power, received-power, and signal-attenuation factor of the signal transmitted by the base station. These means preferably are a microprocessor and use the formula given above, with the value of n and $P_t$ for each base station either stored in the ROM or read from the transmitted signal.

The device further includes means for calculating the location of the vehicle as a function of these distances and the location of each of the base stations. These means preferably use trilateralization or arculation to accomplish this task. The location of each base station preferably is stored in the ROM but also can be read from the signal transmitted from the base station. These means preferably calculate the latitude and longitude of the vehicle's location.

The device further includes means for transmitting, over the cellular telephone network, a signal identifying the vehicle's location. This signal preferably is transmitted upon activation of the device in response to an activation-signal, also transmitted over the cellular telephone network. The operator of the vehicle need not be aware of the device's activation. The activation signal preferably comprises a dual tone multifrequency (DTMF) signal transmitted from any telephone station. In response, the device preferably calculates the vehicle's location and transmits a voice-synthesized message providing this location, in latitude and longitude, back to the caller or to a separate, predetermined telephone station.

Preferably, a central station comprising a computer console also receives the signal identifying the vehicle's location, and this console includes means for displaying a map of the geographical area covered by the cellular telephone network. The vehicle's location on this map also is displayed. An operator at the console preferably follows the path of the monitored vehicle and either guides its operator to a desired location or assists the operator of a tracking vehicle to follow the monitored vehicle. Preferably, the central station establishes a communication link with the monitored and tracking vehicles over the cellular telephone network to enable the operators of these vehicles to use their cellular telephones to call the central station and to receive instructions from the operator of the central station.

A further aspect of the present invention provides methods for determining a vehicle's location. These methods include receiving signals transmitted from a plurality of base stations of a cellular telephone network, and determining the power at which each of these signals is received. These methods further include determining the location of each base station from which each signal is received, the transmitting power at which each signal is transmitted, and the signal-attenuation factor of each signal.

Using these data, the distance between the vehicle and each of the base stations is calculated. This calculation is a function of the transmitting power, received-power, and signal-attenuation factor of the signal received from each base station. The vehicle's location is calculated as a function of these distances and the location of each of the base stations, and a signal identifying this location is transmitted over the cellular telephone network to the vehicle's owner or the operator of a central station.

The identity of the base stations from which the signals are received, and the signals' transmitting power, can be determined from data transmitted with the signals. These signals preferably are the signals transmitted on the set-up or control channels of the base stations. Data providing the attenuation factors for these signals, and the locations of the base stations providing these signals, also can be transmitted with the signals. In the alternative, these data are stored in a replaceable ROM in a device on the vehicle.

The distances between the vehicle and each of the base stations preferably are calculated using the formula given above. Preferably, the value of n, the attenuation factor, is calculated empirically for each base station within the cellular telephone network, and this value, and data providing the location of each base station, are stored in the ROM.

Preferably, the step of calculating the vehicle's location includes calculating the latitude and longitude of the location using trilateralization or arculation, and the step of transmitting a signal identifying the vehicle's location includes transmitting a voice-synthesized message over the cellular telephone network containing this information. This transmission preferably is in response to an activation signal transmitted over the cellular telephone network from a telephone station, and the responding transmission is to a predetermined telephone station.

Finally, the method preferably includes also receiving the signal identifying the vehicle's location at a computer console, and displaying a map of the geographical area served by the cellular network, and the vehicle's location on the map, to an operator of the console.

Other objects, features and advantages of the present invention will be more readily apparent from the detailed description of the preferred embodiments set forth below, taken in conjunction with the accompanying drawings.

BRIEF DESCRIPTION OF THE DRAWINGS

FIG. 4 are diagrams of signal-power versus time for typical signals received by the vehicle locating transceiver of FIG. 2.

FIG. 5 is a diagram illustrating several fields of the digital data for typical signals received by the vehicle locating transceiver of FIG. 2.

FIG. 6 is a graphical illustration of the method of trilateralization used by the present invention.

DETAILED DESCRIPTION OF THE PREFERRED EMBODIMENTS

Figure 1:
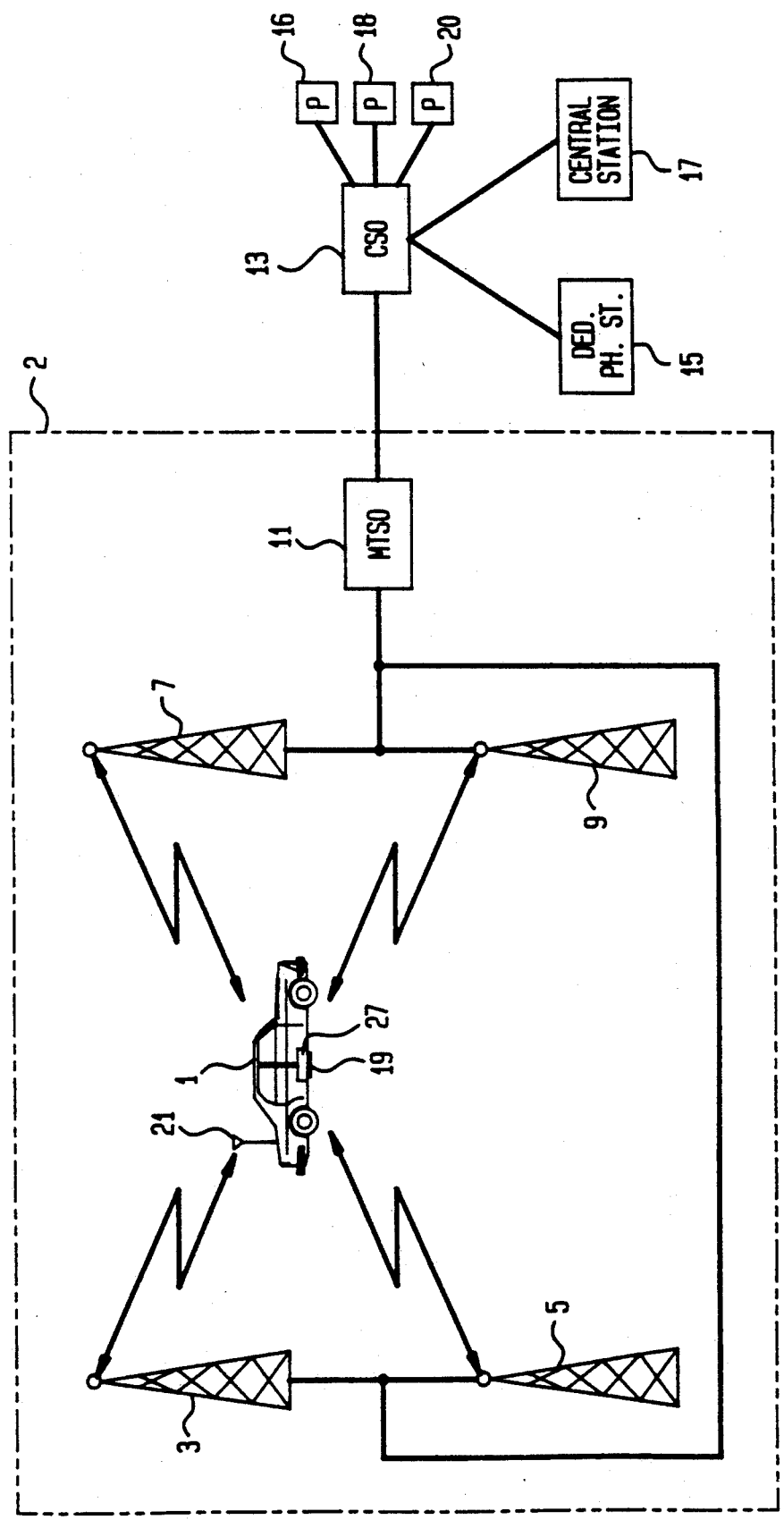
FIG. 1 is a functional block diagram of a vehicle locating and navigating system in accordance with the present invention.

A functional block diagram of a vehicle locating and navigating system in accordance with the present invention is illustrated in FIG. 1. The system includes a small, preferably hidden, vehicle locating transceiver 19 affixed to vehicle 1 which operates within a geographical area served by a cellular telephone network 2. Vehicle 1 also includes a standard cellular telephone 27, including antenna 21, for receiving signals from, and transmitting signals to, the base stations of the cellular network.

Figure 3:
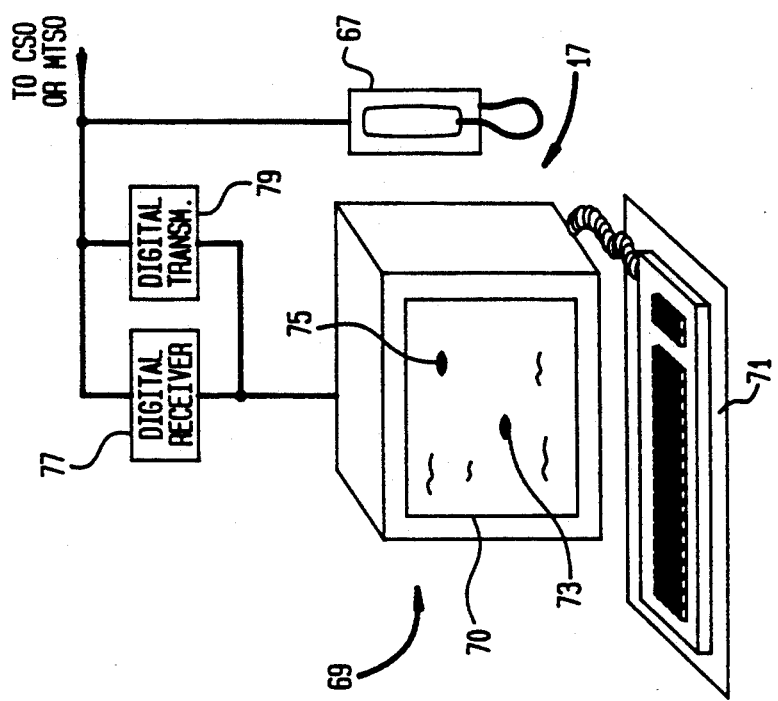
FIG. 3 is a functional block diagram of the central control station for the system of FIG. 1.

Cellular network 2 includes the conventional components of such a network, including a plurality of fixed base stations such as base stations 3, 5, 7 and 9, and one or more mobile telephone switching offices (MTSO's) 11 which communicate with the base stations over land lines or radio-communication links. Each MTSO 11 is connected to the public telephone network through land lines connecting the MTSO to one or more central switching offices (CSO's) 13. These connections enable communication with mobile telephones served by the cellular network through virtually any telephone station in the world, such as telephone stations 16, 18 and 20, dedicated phone station 15 or phone station 67 within control station 17 (FIG. 3).

In a manner which is conventional for cellular telephone networks, each base station within the network is assigned a number of two-way voice channels, i.e., channels used to transmit voice signals to and from mobile units operating within the network, and a number of set-up or control channels, i.e., channels used for the transmission of digital control information to and from the mobile units. The function of the set-up or control channels includes, inter alia, establishing a voice-communication link with a mobile unit prior to the initiation of a telephone conversation. Generally, each of the channels assigned to each of the base stations operates at a different frequency in order to avoid interference. Because of the limited number of frequencies available within each network, however, base stations remote from each other may be assigned one or more of the same frequency channels. In the United States, these channels generally operate at frequencies between approximately 825 and 890 megahertz (MHz), and channels operating from the same base station are separated by approximately 45 MHz.

Generally, voice information transmitted over the voice channels is effected using frequency modulated (FM) analog signals, and set-up and control information transmitted over the control channels is effected using FM digital signals. Other methods of modulating voice and digital data onto the carrier signals, such as amplitude modulation (AM), quadraduture phase shift keying (QPSK) and binary phase shift keying (BPSK), are feasible, however, and likely will be used by cellular telephone networks in the future.

In the United States, the Federal Communications Commission (FCC) limits the maximum power of a carrier signal transmitted from the base station of a cellular telephone network to 500 watts (57 dbm). Generally, however, the actual power of transmission is considerably less, e.g., less than 100 watts (50 dbm), in order to avoid interference between base stations. In most cellular networks, the power of transmission of the control channels for each base station is higher than the power of transmission of the voice channels.

FIG. 5 is a diagram illustrating typical frequency-modulated digital data transmitted on a control channel of a base station of a cellular telephone network. These data are segregated into a plurality of fields, only five of which are shown in the illustration. Each field contains various set-up and/or control information to, inter alia, establish a communication link between a mobile phone operating within the network and the base station transmitting the control signal. These fields generally include fields identifying the base station transmitting the signal and, in some cases, fields providing various descriptive information with respect to the base station, such as the power at which the signal is transmitted.

Generally, a mobile phone seeking to establish a telephonic link through the network establishes communication with the base station from which the strongest control signal is received. Upon making this determination, an automatic protocol is followed to establish the voice communication link. If the power of this link becomes inadequate for proper communication, such as, e.g., the mobile phone traveling outside of the normal transmitting range of the base station with which the mobile phone is in communication, a handoff protocol is followed for transferring the link from one voice channel to another, generally to a channel transmitted from a different and nearer base station.

The power of the signals received from the control and voice channels from each base station within the network decreases in a fixed amount (attenuation factor) in direct relationship to the distance from the base station. This relationship corresponds to the following formula:

$$P_r = kP_t/d^n,$$

wherein $P_r$ equals the power at which the signal is received from the base station, k is a constant, $P_t$ equals the power at which the signal is transmitted from the base station, d equals the distance between the base station and the point where the signal is received, and n is the attenuation factor. The attenuation factor generally ranges between 2 and 6, and depends principally upon the geographical terrain, e.g., farmland, mountains, cities, suburban regions, etc., in which the base station is located.

Figure 2:
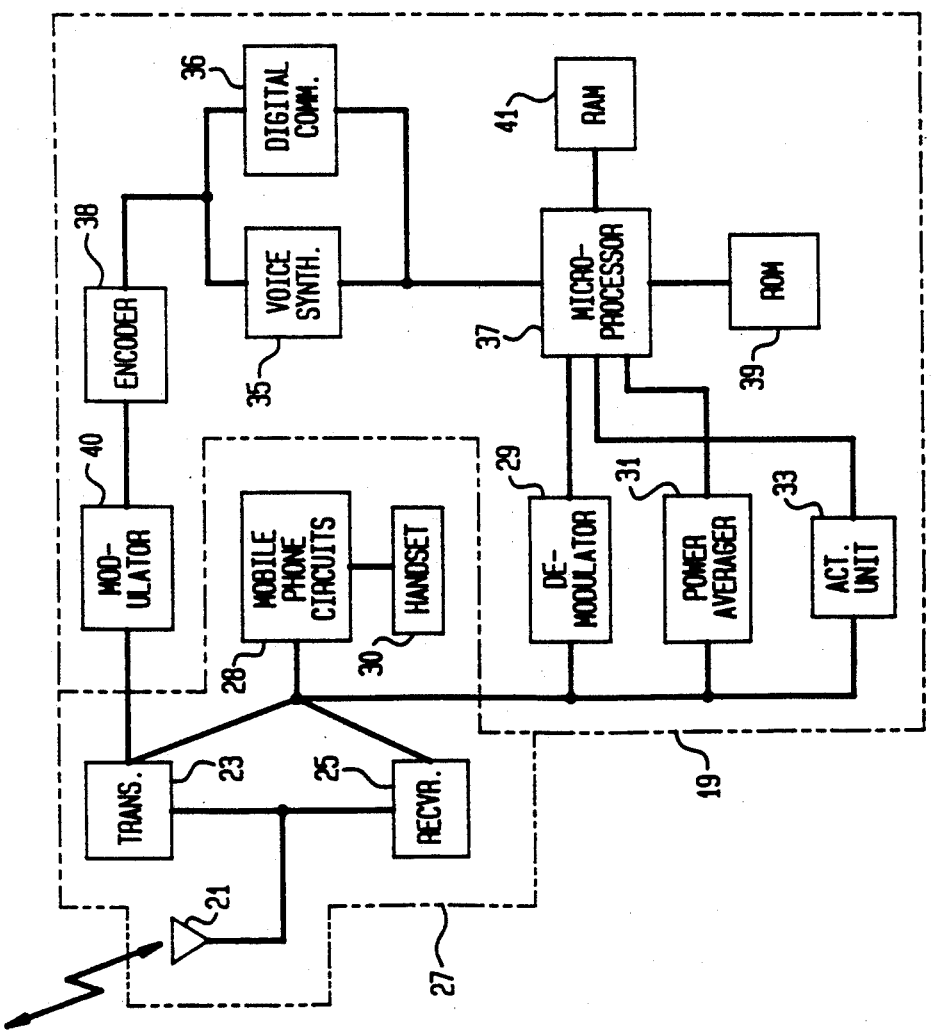
FIG. 2 is a functional block diagram of the vehicle locating transceiver for the system of FIG. 1.

FIG. 2 is a block diagram of the principal components of vehicle locating transceiver 19 and mobile telephone 27. Vehicle locating transceiver 19 preferably is a modular, add-on component to a standard, mobile telephone and, therefore, takes advantage of components already present in such a phone. Of course, vehicle locating transceiver 19 also could be designed to operate independently of a mobile telephone and, in that case, all components of the mobile telephone used by the transceiver, as shown in FIG. 2, could be included in the transceiver.

Signals transmitted from a set of base stations, such as base stations 3, 5, 7 and 9, are detected by antenna 21 and receiver 25. Receiver 25 is a component of mobile telephone 27 and transmits the received signals in the normal manner to the circuits 28 of the mobile phone. When these signals include a paging signal for mobile phone 27, these circuits further process these signals, set up a communication link between the mobile telephone and the base station from which the strongest signal is received, activate a signaling tone to notify the mobile phone's user of the incoming call and complete the voice communication over voice channels between the mobile telephone and base station. The user uses handset 30 connected to mobile phone circuits 28 in the conventional manner for the receipt and transmission of audible tones.

Antenna 21 and receiver 25 also function to receive an activation signal for vehicle locating transceiver 19. This signal can be in the same format as a paging signal for mobile telephone 27, i.e., a dual tone multiple frequency (DTMF) signal transmitting the ten digit number uniquely identifying mobile telephone 27. The activation signal can be a second, unique DTMF signal uniquely identifying vehicle locating transceiver 19. If transceiver 19 is an add-on module to a mobile telephone, this number can incorporate the digits assigned to that telephone with the addition of several digits or symbols at the beginning and/or end of that number.

The activation signal for vehicle locating transceiver 19 is transmitted to the transceiver over cellular telephone network 2 from any telephone station such as, e.g., telephone stations 16, 18 or 20, dedicated phone station 15, or a telephone station 67 (FIG. 3) associated with control station 17. If the operator of vehicle 1 desires navigational assistance from control station 17, he or she can activate transceiver 19 by transmitting the activation signal from mobile telephone 27. In the alternative, an activating switch (not shown) can be installed directly on the mobile phone or transceiver, preferably in a hidden location.

Activation unit 33 continuously scans the transmissions received by receiver 25 for the activation signal. If this signal is received, activation unit 33 transmits a signal to microprocessor 37 which transmits corresponding activation signals to the other components of the system.

Upon activation, demodulator 29 demodulates each control signal received through antenna 21 and receiver 25. Since these signals are transmitted from base stations of varying distances from vehicle 1, they have varying strengths. If the strength of a signal is sufficient for accurate demodulation of the transmitted data, demodulator 29 operates upon the signal and determines the digital data transmitted by the signal. Antenna 21, receiver 25 and demodulator 29 are capable of receiving and demodulating control signals from at least three base stations within most locations served by cellular network 2. Demodulator 29 is a standard device for the method of modulation used by the network, generally FM modulation. As stated above, the method of modulation also may be AM, QPSK, BPSK or some other mode of modulation.

Demodulator 29 transmits the various fields of demodulated digital data from each of the detected control signals to microprocessor 37. Microprocessor 37 reads these data and, from the fields providing the identities of the base stations transmitting the signals, determines these identities. This determination is made by comparing these data with the digital identities of each of the base stations within cellular network 2 stored in ROM 39. Preferably, ROM 39 also permanently stores digital records of the identities of the base stations in other, adjoining cellular telephone networks in which vehicle 1 is likely to operate. In the alternative, demodulator 29 can determine and transmit the transmission—frequencies of each of the detected control or voice channels, and microprocessor 37 can determine the identities of the base stations from these frequencies.

If the control signals transmitted from the base stations of cellular network 2 also include a field of data providing the power at which each signal is transmitted from the base station (e.g. 75 dbm, 50 dbm, 35 dbm, etc.), microprocessor 37 reads these data as provided from demodulator 29. If the cellular network is not configured to provide this information with the control signals, these data are permanently stored in ROM 39 in association with the identification of each base station. In the latter case, microprocessor 37 reads both the identity of the base station and the power of its transmission from the data stored in ROM 39.

ROM 39 also stores, in association with the data identifying each base station, data providing the location of the base station, in, e.g., latitude and longitude, and the attenuation factor of the base station. Since the attenuation factor is unique for each base station and depends principally upon many factors concerning the geographical region in which the base station is located, this factor preferably is empirically determined for each base station before ROM 39 is programmed.

Obviously, over time, the data programmed into ROM 39 will become obsolete. This obsolescence of the data most likely will be caused by modifications (e.g., new construction) within the geographical area of a base station, the construction of new base stations, refinements in the empirical calculations of the attenuation factors, changes in the power at which control signals are transmitted, and/or modifications in the digital fields of the control signals. ROM 39, therefore, is a plug-in device which easily can be replaced with a new ROM containing the updated data without the necessity for replacing the remaining components of vehicle locating transceiver 19.

Power averager 31 determines the average power at which each control signal, demodulated by demodulator 29, is received by antenna 21 and receiver 25. The instantaneous power at which these signals are received corresponds to the formula: $P_r = kP_t/d^n$, as discussed above. As a result of fading and similar phenomena of radio transmissions, the actual received power varies to some extent with time from the power predicted by this formula.

The averaging function performed by power averager 31 is illustrated graphically in FIG. 4. This figure depicts graphs for the instantaneous power of control signals 43, 45, 47 and 49 which are received by vehicle locating transceiver 19 from base stations 3, 5, 7 and 9, respectively. The y-axis of each graph represents the power in dbm at which each signal is received by the transceiver, and the x-axis of each graph represents the time-period of receipt. Power averager 31 calculates the average power of each signal over a fixed period of time, e.g., 10 milliseconds. This average power for signals 43, 45, 47 and 49 is represented by the areas 51, 53, 55 and 57, respectively, shown in these graphs, divided by the period (10 m.s.) over which the average is taken. These average-power calculations are performed and transmitted to microprocessor 37 continuously while vehicle locating transceiver 19 is activated. The microprocessor stores these data in RAM 41.

Microprocessor 37 uses the data from power averager 31 to calculate the distance d between the transceiver and each base station using the formula discussed above. The values for k and n are retrieved from ROM 39, the average values for $P_r$ are retrieved from RAM 41, and the values for $P_t$ are either retrieved from ROM 39 or read directly from the control signals (if, as discussed above, this information is present in the control signals). The calculated values for d for each base station are stored in RAM 41.

Microprocessor 37 then calculates the approximate position of transceiver 19 (and vehicle 1) with respect to the base stations from which the signals are received using the process of arculation or trilateralization illustrated in FIG. 6. The position (latitude and longitude) of each base station is retrieved from ROM 39, and the distance from each base station to the transceiver/vehicle is retrieved from RAM 41. These distances are illustrated in FIG. 6 by arcs 61, 65, 63 and 59 for base stations 3, 5, 7 and 9, respectively. The approximate location of the vehicle is identified by the area "x" enclosed by the intersection of these four arcs. As is evident from this description, the accuracy of this locational determination increases with the number of base stations from which control signals are received and identified, and with respect to which a distance calculation can be performed. Generally, a distance-determination to at least three base stations is required for the vehicle's location to be ascertained. When distances to more than three base stations are available, microprocessor 37 can calculate the vehicle's location using different combinations of the distances to three of the base stations and determine the vehicle's location on the basis of the average of these calculations.

Microprocessor 37 stores the vehicle's location (latitude and longitude) in RAM 41, and continuously updates these data as new information is received from power averager 31 and demodulator 29. The locational data also are transmitted to voice synthesizer 35 and digital communicator 36. Voice synthesizer 35 converts the digital data from microprocessor 37 to an analog signal representing a synthesized voice stating the locational information. Encoder 38 encodes this analog signal for the telephone station to which it should be transmitted. This telephone station can be the same telephone station from which the activation signal was received, any other telephone station connected to CSO 13, or dedicated phone station 15. Transmission of the locational information to a dedicated phone station prevents this information from being received by an unauthorized person activating the device. The encoded, analog voice signal is FM modulated by modulator 40 and transmitted over the cellular telephone network to the designated phone station by transmitter 23 through antenna 21. Transmitter 23 and antenna 21 are the same apparatus used for transmissions from mobile telephone 27. Of course, depending upon the compatibility of cellular network 2, modulator 40 can use other forms of modulation.

Microprocessor 37 also transmits the digital locational data to digital communicator 36 which processes these data for transmission in digital format over the cellular network. Encoder 38 also encodes these digital data for transmission to a designated telephone station associated with CSO 13. In this case, the telephone station is digital receiver 77 associated with central station 17, shown in FIG. 3. The encoded, digital data are transmitted to modulator 40 which FM modulates these data for transmission over the cellular network. This transmission also is effected through transmitter 23 and antenna 21.

Control station 17 is connected to the cellular network through CSO 13 and MTSO 11. Of course, control station 17 also could be connected to the cellular network directly through MTSO 11. Digital receiver 77 receives the digital, locational information and transmits a corresponding digital signal to computer 69. Computer 69 processes this information, in a conventional manner, and projects a representational symbol 73 of the location of vehicle 1 on display screen 70 with respect to a graphical representation of a map, also displayed on the screen, of the region served by cellular network 2. The position 75 of a second vehicle, which can be a tracking vehicle guided by an operator of control station 17, also can be displayed on computer screen 70. This second vehicle can be equipped with a vehicle locating transceiver, similar to transceiver 19, which transmits locational information to control station 17 in the same manner as the transceiver on vehicle 1. The various functions and operations of computer 69 are controlled by the operator in a conventional manner using keyboard 71.

Control station 17 also is equipped with digital transmitter 79 and telephone station 67. Digital transmitter 79 is controlled by the operator through computer 69 and keyboard 71. This transmitter can transmit digital signals back to transceiver 19 to, e.g., activate the transceiver. In this case, activation unit 33 is responsive to an activation signal transmitted either in digital or DTMF format.

Control station 17 also is equipped with conventional telephone station 67, which can function as the dedicated telephone station 15. An operator of vehicle 1 seeking, e.g., assistance in navigation can communicate with the operator of control station 17 from mobile telephone 27 to telephone station 67. By activating vehicle locating transceiver 19, the operator of the vehicle can cause his or her position to appear on display screen 70 of computer 69 to enable the operator of control station 17 to provide such assistance. Telephone station 67 also can be used by the operator of control station 17 to provide instructions to an operator of the tracking vehicle over a mobile telephone located in that vehicle.

Although particular embodiments of the present invention have been shown and described, many varied embodiments incorporating the teachings of the present invention easily may be constructed by those skilled in the art. For example, the identity of the base stations from which signals are received can be determined by the frequency of the voice or control channels and, if one or more channels of the base stations within the cellular network transmit at the same frequency, the identities of the base stations can be determined from the particular combination of channel-frequencies received at any given time. The monitored signals from which the strength/distance determinations are made can be signals other than the control channels, such as the voice channels or any other channels or signals normally transmitted from the base stations for cellular-telephone communications. Also, rather than store in the ROM data providing the location of each base station, the value of k and the value of n, additional fields of data can be included in the control signals to provide this information. In that case, a new ROM would not be required when this information is updated.

What is claimed is:

1. A system for determining a vehicle's location comprising:
   (a) receiving means for receiving signals transmitted from a plurality of base stations of a cellular telephone network;
   (b) first determining means for determining the received-power at which each of said signals is received;
   (c) second determining means for determining the location of each of said base stations from which each of said signals is transmitted, the transmitting power at which each signal is transmitted, and the signal-attenuation factor of each signal;
   (d) first calculating means for calculating the distance between said vehicle and each of said base stations as a function of the transmitting power, received-power, and signal-attenuation factor of each of said signals;
   (e) second calculating means for calculating the vehicle-location of said vehicle as a function of said distances and the location of each of said base stations; and
   (f) transmitting means for transmitting a signal identifying said vehicle-location.

2. A system as in claim 1, wherein said signals comprise control-channel signals transmitted from said base stations.

3. A system as in claim 1, wherein said first determining means comprise means for averaging the received-powers at which each of said signals is received over a fixed period of time.

4. A system as in claim 1, further comprising storing means for storing for each of said base stations data identifying said base station, said base station's location, and the signal-attenuation factor of the signal transmitted by said base station.

5. A system as in claim 4, wherein said storing means further comprise means for storing for each of said base stations data identifying the transmitting power of the signal transmitted by the base station.

6. A system as in claim 1, wherein each of said signals includes information identifying the base station from which the signal is transmitted.

7. A system as in claim 6, wherein said information is the frequency of the signal's transmission.

8. A system as in claim 6, wherein said information is digital data transmitted by the signal.

9. A system as in claim 6, wherein each of said signals further includes data identifying the transmitting power at which the signal is transmitted.

10. A system as in claim 9, wherein each of said signals further includes data identifying the signal-attenuation factor of the signal.

11. A system as in claim 4, wherein said storing means comprise a replaceable ROM.

12. A system as in claim 1, wherein said first calculating means calculates each of said distances on the basis of the formula:

$$P_r = kP_t/d^n,$$

wherein $P_r$ equals the received-power of the signal transmitted from the base station, k is a constant, $P_t$ equals the transmitting power of the signal transmitted from the base station, n equals the signal-attenuation factor of the signal transmitted from the base station, and d equals the distance between the base station and the vehicle.

13. A system as in claim 12, wherein n ranges between 2 and 6.

14. A system as in claim 1, wherein said second calculating means calculates the latitude and longitude of the vehicle-location of said vehicle using arculation, and said transmitting means transmits a voice-synthesized message containing said latitude and longitude.

15. A system as in claim 1, wherein said second calculating means calculates the latitude and longitude of the vehicle-location of said vehicle using arculation, and said transmitting means transmits a digital signal containing said latitude and longitude.

16. A system as in claim 1, further comprising means for activating said system in response to an activation-signal transmitted over said cellular telephone network.

17. A system as in claim 16, wherein said activation signal comprises a DTMF signal transmitted from a telephone station.

18. A system as in claim 1, further comprising a computer console for receiving the signal identifying said vehicle-location, and wherein said console comprises means for displaying a map of the geographical area covered by said cellular telephone network and the vehicle-location of said vehicle on said map.

19. A system as in claim 1, further comprising means for transmitting the signal identifying said vehicle-location over said cellular telephone network.

20. A system as in claim 19, further comprising means for transmitting the signal identifying said vehicle-location to a predetermined telephone station.

21. A method for determining a vehicle's location comprising:
   (a) receiving signals transmitted from a plurality of base stations of a cellular telephone network;
   (b) determining the received-power at which each of said signals is received;
   (c) determining the location of each of said base stations from which each of said signals is transmitted, the transmitting power at which each of said signals is transmitted, and the signal-attenuation factor of each of said signals;
   (d) calculating the distance between said vehicle and each of said base stations as a function of the transmitting power, received-power, and signal-attenuation factor of each of said signals;
   (e) calculating the vehicle-location of said vehicle as a function of said distances and the location of each of said base stations; and
   (f) transmitting a signal identifying said vehicle-location.

22. A method as in claim 21, wherein said signals comprise control-channel signals transmitted from said base stations.

23. A method as in claim 21, further comprising the step of averaging the received-powers at which each of said signals is received over a fixed period of time.

24. A method as in claim 21, further comprising the step of storing for each of said base stations data identifying said base station, said base station's location, and the signal-attenuation factor of the signal transmitted by said base station.

25. A method as in claim 24, further comprising the step of storing for each of said base stations data identifying the transmitting power of the signal transmitted by the base station.

26. A method as in claim 21, wherein each of said signals includes information identifying the base station from which said signal is transmitted.

27. A method as in claim 26, wherein said information is the frequency of the signal's transmission.

28. A method as in claim 26, wherein said information is digital data transmitted by the signal.

29. A method as in claim 26, wherein each of said signals further includes data identifying the transmitting power at which said signal is transmitted.

30. A method as in claim 29, wherein each of said signals further includes data identifying the signal-attenuation factor of said signal.

31. A method as in claim 24, wherein said step of storing comprises storing said data in a replaceable ROM.

32. A method as in claim 21, wherein said step of calculating the distance between said vehicle and each of said base stations is based on the formula:

$$P_r = kP_t/d^n,$$

wherein $P_r$ equals the received-power of the signal transmitted from the base station, k is a constant, $P_t$ equals the transmitting power of the signal transmitted from the base station, n equals the signal-attenuation factor of the signal transmitted from the base station, and d equals the distance between the base station and the vehicle.

33. A method as in claim 32, wherein n ranges between 2 and 6.

34. A method as in claim 21, wherein said step of calculating the vehicle-location of said vehicle includes calculating the latitude and longitude of the location of said vehicle using arculation, and said step of transmitting a signal identifying said vehicle-location includes transmitting a voice-synthesized message containing said latitude and longitude.

35. A method as in claim 21, wherein said step of calculating the vehicle-location of said vehicle includes calculating the latitude and longitude of the location of said vehicle using arculation, and said step of transmitting a signal identifying said vehicle-location includes transmitting a digital signal containing said latitude and longitude.

36. A method as in claim 21, further comprising the step of initiating said method in response to an activation-signal transmitted over said cellular telephone network.

37. A method as in claim 36, wherein said activation signal comprises a DTMF signal transmitted from a telephone station.

38. A method as in claim 21, further comprising the step of receiving the signal identifying said vehicle-location at a computer console, and displaying a map of the network and the vehicle-location of said vehicle on said map.

39. A method as in claim 21, further comprising the step of transmitting the signal identifying said vehicle-location over said cellular telephone network.

40. A method as in claim 39, further comprising the step of transmitting the signal identifying said vehicle-location to a predetermined telephone station.

* * * * *

UNITED STATES PATENT AND TRADEMARK OFFICE
CERTIFICATE OF CORRECTION

PATENT NO. :  5,208,756
DATED      :  May 4, 1993
INVENTOR(S) : Song

It is certified that error appears in the above-identified patent and that said Letters Patent is hereby corrected as shown below:

Column 14, claim 38, line 3, after "the" insert --geographical area covered by said cellular telephone--.

Signed and Sealed this

Twenty-first Day of December, 1993

Attest:

BRUCE LEHMAN

Attesting Officer　　　Commissioner of Patents and Trademarks